United States Patent [19]
Bald et al.

[11] 4,070,120
[45] Jan. 24, 1978

[54] POSITIONING DEVICE

[76] Inventors: Hubert Bald, Dornenstrasse 26, 5820 Gevelsberg, Germany; Wulf Witte, Hans-Luther-Allee 17, 4300 Essen, both of Germany

[21] Appl. No.: 712,296
[22] Filed: Aug. 6, 1976
[30] Foreign Application Priority Data
   Aug. 21, 1975  Germany .............................. 2537146
[51] Int. Cl.² .............................................. B25G 3/00
[52] U.S. Cl. ........................................ 403/13; 403/335
[58] Field of Search ..................... 285/336, 276, 24; 403/335–338, 282, 384, 388, 13, 14; 29/464, 526

[56] References Cited
U.S. PATENT DOCUMENTS

| | | | |
|---|---|---|---|
| 2,559,198 | 7/1951 | Ogden | 52/585 X |
| 3,329,447 | 7/1967 | Hitz | 285/336 X |
| 3,534,461 | 10/1970 | Luketa | 29/464 |
| 3,820,227 | 6/1974 | Menne | 29/464 X |

FOREIGN PATENT DOCUMENTS 654,263  3/1963  Italy ..................................... 285/336

*Primary Examiner*—Wayne L. Shedd
*Attorney, Agent, or Firm*—Sughrue, Rothwell, Mion, Zinn and Macpeak

[57] ABSTRACT

A device to position two components in each of three mutually perpendicular directions. One component having a projecting pin and the other such a conical bore that, on the components being pressed together, a spherical surface on the pin bears against the conical wall of the bore thereby causing the bearing surfaces to be deformed when the components abut.

2 Claims, 26 Drawing Figures

U.S. Patent   Jan. 24, 1978   Sheet 1 of 3   4,070,120
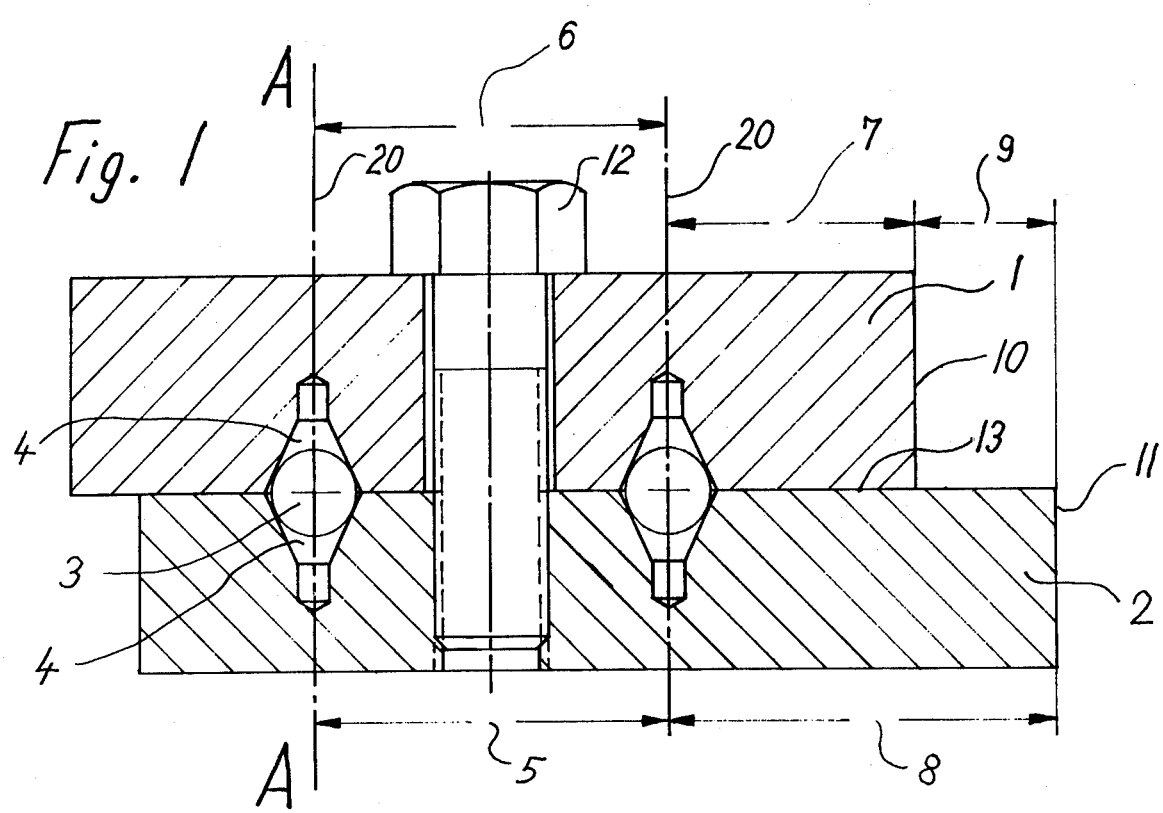
Fig. 1
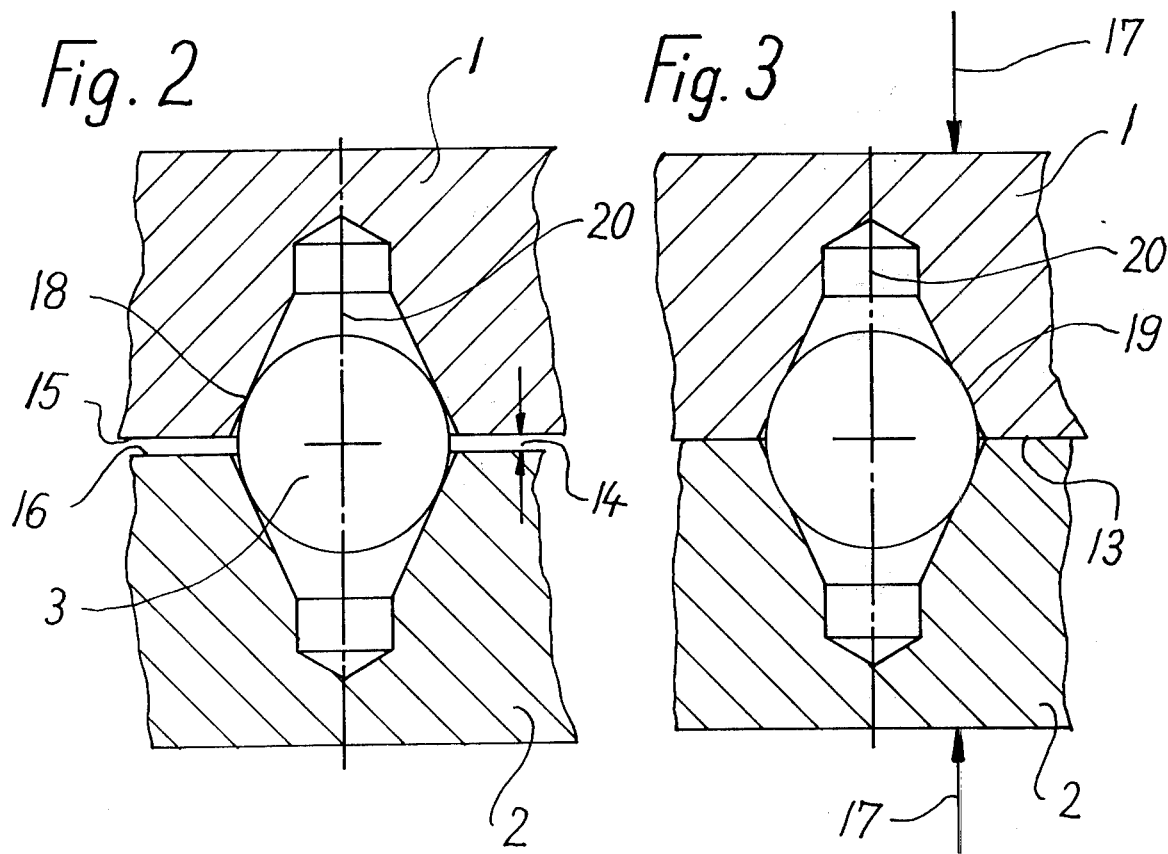
Fig. 2
Fig. 3

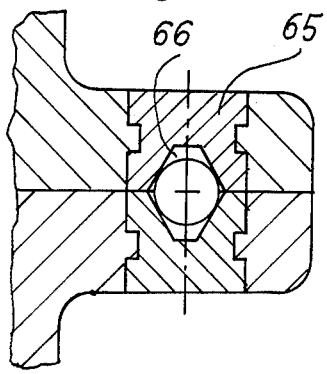
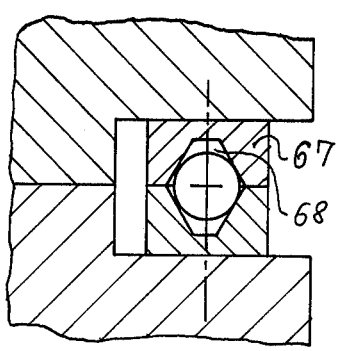
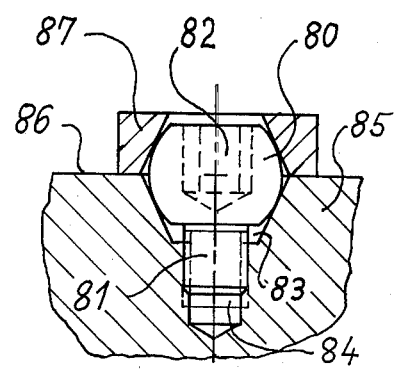
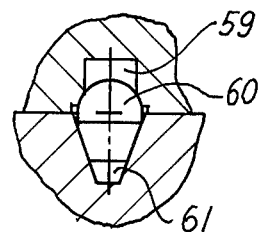
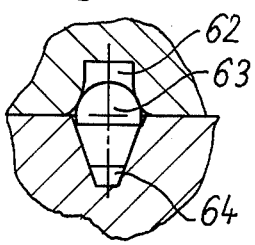
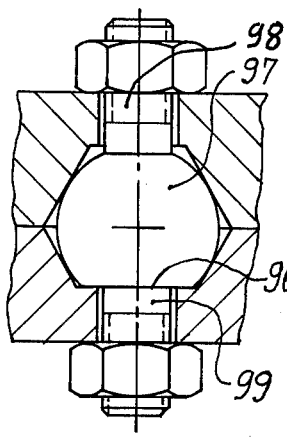
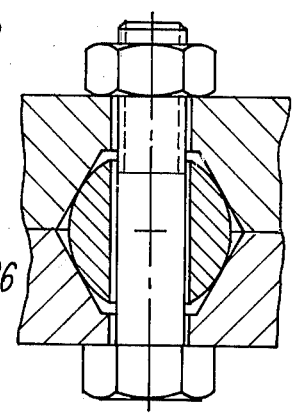
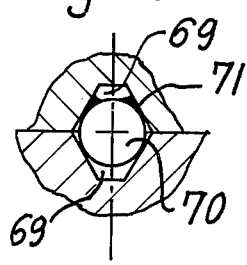
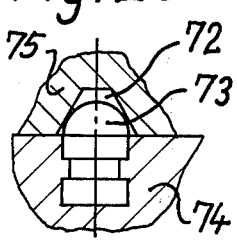
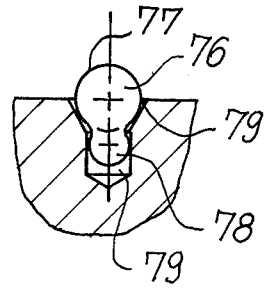
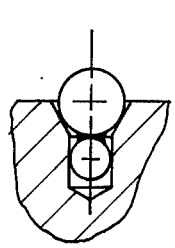
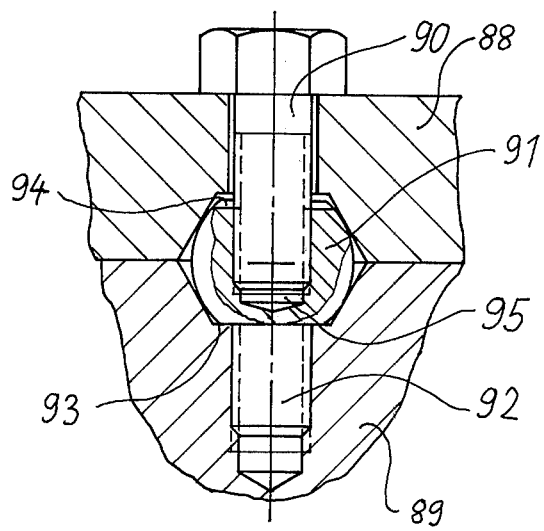

POSITIONING DEVICE

BACKGROUND OF THE INVENTION

The present invention relates to a positioning device in which two components — on being urged towards one another — abut at an interface and are located in predetermined relative juxtaposition.

When several components are to be connected to one another in predetermined position and when the relative position is to be maintained as accurately as possible, one resorts to a positioning or jointing device of the kind mentioned above. An interface is defined by respective surface portions of two components, which abut against one another to determine their relative position in one of three mutually perpendicular co-ordinates of space. In one known form of such a jointing device, at least one of the components is provided with a positioning recess in the form of a blind cylindrical bore which extends inwardly from the abutment surface. The respective other component is provided with at least one cylindrical pin, which is adapted to enter a respective bore in the first mentioned component. These pins determine the remaining two co-ordinates of the position of the components relative to one another. The components may be urged towards one another by clamping screws, or by similar means. The positioning device should not only determine the relative position in a positive or shape-locking manner on a single occasion but, after disassembling the components and subsequently clamping them together again, reproduce the initial relative position of the components. On the other hand, after the releasing of tightening means of the clamping means, the components should be capable of being separated from one another without appreciable expenditure of effort and without damaging the positioning elements.

In place of the cylindrical pins, it has been known to employ tapering pins. It is disadvantageous in this known device that, for the required accuracy, the skill and effort involved in the prefabrication of the recesses is very great and the narrow tolerances in spite of appropriate effort are often only maintained with difficulty. A plurality of possible faults of such known devices will be considered:

a. The position of the axis of the recess is subject to tolerance.
b. The axis of the bore may not be perpendicular to the interface.
c. The diameter of the bore may vary. The consequence is an inaccurate positioning of the bore being oversize and a wedging and difficulties in disassembly on the bore being undersize.
d. The bore may be non-circular in cross-section.

For the case that more than one positioning location is provided, there is still to be added:

e. Deviation in the spacing of the recess axes in one or both components.

It is an object of the present invention to provide a device in which the positioning accuracy can be increased compared with known devices of generally similar kind without materially increasing and, preferably, decreasing the cost of production and/or the degree of skill involved therein.

For example to eliminate the fault e), one can provisionally tighten together the components in the intended position and then from the outside put in the bores for the fit pins in common operating steps for both components, by which one in the end only still secures the position attained in the setting up of the intended position; in that case, there is not concerned a true positioning device. Moreover, the above stated additional condition is also not fulfilled, namely that the positioning means are to be mountable only from the joint face.

If one in that case employs conical pins in place of the cylindrical pins, then although with certainty one obtains freedom from play and at the same time easier disassembly, it is still impossible just as before to undertake a prefabrication of the bores.

If in place of cylindrical fit pins, one employs longitudinally slotted, hollow-cylindrical spring pins, then the positioning accuracy is worse, while in all cases the assembly (pressing in of the pins) and the disassembly are facilitated.

The principle of the spring-ball detent is also to be mentioned as known device for the positioning of two components in a predetermined relative position, in which a ball movable in a cylindrical bore can under the pressure of a spring project out from the joint surface of a component and for example notch into the conical bore in the contacting joint surface of another component. Apart from the additional effort caused by the accommodation of a spring, this device is not suitable for the set targets already solely for the reason that the mobility of the ball in the cylindrical bore demands a certain play, which in its turn necessarily causes a positioning in accuracy.

Still to be mentioned peripherally are press-stud-like devices, the accuracy of which is however hardly comparable with the above-mentioned device.

SUMMARY OF THE INVENTION

According to the present invention, there is provided a jointing device comprising a first component having at least one recess therein, said recess having an opening in an outer surface portion of said first component and having a wall surface portion disposed symmetrically with respect to an axis extending substantially perpendicularly of said outer surface portion, and a second component provided with a positioning element having a free end portion thereof extending outwardly from an outer surface portion of said second component and adapted to be introduced into said recess by way of said opening, said free end portion of said positioning element having a centering portion of reducing cross-section towards an outer extremity of said free end portion and having an axis of symmetry alignable with said first mentioned axis of symmetry, whereby — on said first and second components being urged towards one another to cause said positioning element to enter said recess — said outer surface portions of said first and second components are brought into mutually abutting relationship to define an interface between said first and second components whilst only said centering portion of said positioning element is brought to bear against said symmetrical wall surface portion of said recess, said centering portion being brought to bear with sufficient force to cause material deformation of at least one of said symmetrical wall surface portion and said centering portion thereby to enlarge at least one of said bearing surface and to positively locate said positioning element in said recess free of play in the direction of said axis and in at least one direction transverse thereto, thereby positioning said first and second components in abutting relationship and in predetermined juxtaposition relative to one another.

The centering portion of the positioning element tapers outwardly so that the centering surface in the form of the symmetrical wall surface portion of the positioning element can be brought to bear against only the centering portion on the associated joint surfaces being urged towards one another and also during the later forcing together of the components. A deformation of the positioning element and/or the recess wall surface portion is brought about predominantly by surface pressure during the forcing together so that the area of mutual contact at the bearing surfaces enlarges. The positioning element is thus positively located free of play in the axial and in at least one transverse-axial direction.

In the simplest case then, the centering surface is the rotationally symmetrical wall surface portion of a conical bore and the centering portion is a rotationally symmetrical part of a spherical surface; it is evident that also two circularly conical bores, lying opposite one another and with a spherical body clamped therein, lead to analogous results at a positioning location.

Apart from the rotationally symmetrical centering wall surface portion, other kinds of symmetrical centering wall surfaces are also suitable insofar as they are structured to be only centrally symmetrical, i.e. are part of the surface of a centrally symmetrical body. In that case, by a centrally symmetrical body is to be understood such a body in which at least two planar sections, different from one another, through the main axis of the body display like sectional contours. To be named as example of centrally symmetrical bodies are multi-surface double-pyramids and ellipsoids.

The forcing together of the components starting after ensued bearing of centering wall surface and the centering portion of the positioning element is to be interpreted in the widest sense and namely so that the forcing together can take place not only in consequence of static forces (tightening screw) but also under the effect of dynamic forces (impacts by a hammer).

By reference to the afore-mentioned simplest form of execution of the device for the positioning with the aid of two circular conical bores, which are disposed opposite one another and which in the hollow space formed in common are to clamp a sphere therebetween, the aspects touched on above for the state of the art shall now also be discussed.

A circularly conical bore lets itself be brought into a surface with very much less effort than a cylindrical or fit bore, which mostly must have a greater depth. The tolerances according to (a) let themselves be reduced since the drilling tool and the tensioning means thereof thanks to the smaller necessary projection can be developed to be of greater stiffness. Although, the production costs are also lower since only a single operating step is necessary.

The fault (b) plays only a sub-ordinate part since in the bearing regions, in which the actual positioning functions are exercised, deformations of the positioning elements and/or the recess walls occur in any case. For the same reason, the faults (c) and (d) also play no part.

One will in that case so dimension the convergence at least for one recess of each positioning location that no self-locking occurs and so that an easy disassembly is assured.

Insofar as spheres are employed as positioning elements, it is easy to obtain very accurate elements at low cost, since spheres are produced and available on the market in enormous numbers within classified tolerance fields.

It is further to be noted that the positioning recess need not be a bore, but can also for example be a groove as will subsequently be described in detail. It is typical of a device embodying the invention that — on the putting together of the components — initially outer surface portions defining the surfaces at the interface do not contact one another, but the centering wall surfaces of the recesses come to sit or bear on the centering portions of the positioning elements. Only when the components are clamped together by the action of force directed perpendicularly to the interface or joint surfaces does the surface pressure effecting the deformation arise. This surface pressure persists until the joint surfaces abut closely against one another. This leads thereto, that the assembly proceeds in two stages, in the first of which a "coarse" alignment of the components takes place, which requires no or only a very small expenditure of force transversely to the joint surfaces. This facilitates automation of the operating steps carried out in the assembly of a device embodying the invention.

BRIEF DESCRIPTION OF THE DRAWINGS

Embodiments of the present invention will now be more particularly described by way of example with reference to the accompanying drawings, in which:

FIG. 1 shows a device embodying the invention and in which two components are positioned in predetermined relative position with the aid of bores defining a respective positioning recess at each of two positioning locations;

FIG. 2 shows a section on a line A—A in FIG. 1, after a first jointing step has been completed;

FIG. 3 shows a section on the line A—A in FIG. 1, after a second jointing step has been completed;

FIGS. 5 and 26 represent respective further embodiments.

DESCRIPTION OF THE PREFERRED EMBODIMENTS

Figure 4:
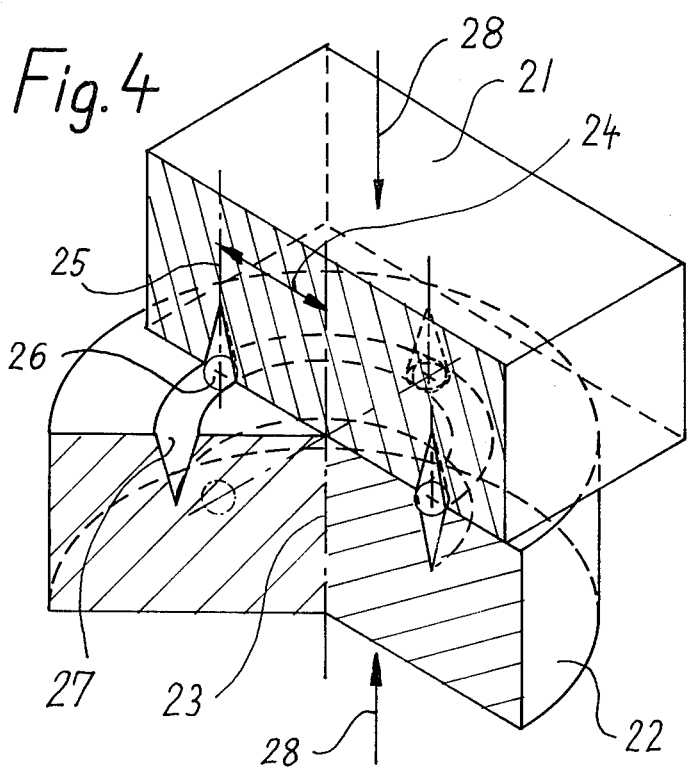
FIG. 4 shows in perspective the positioning of two components in a predetermined relative position with the aid of bores in one component and a groove in the respective other component, the bores and groove forming co-operating positioning recesses.

Referring now to the accompanying drawings, two components 1 and 2 to be positioned are shown in each of FIGS. 1 to 3. Each of the components 1 and 2 is provided with two positioning recesses 4 in the form of conical bores which extend from the interface defined by the components 1 and 2. The bores are each symmetrical about a centering center line 20, which is disposed perpendicularly to the interface 13 at which outer surfaces of the respective components abut against one another. Each bore is dimensionally determined by the co-ordinates of the intersection of the centering center line 20 with the interface 13 defined at the common joint surfaces. Two bores 4 each, which belong to different components 1 and 2, are aligned co-axially, i.e. centered, with the aid of a positioning element 3 with respect to their centering centre lines 20. The positioning elements 3, which are here developed as spheres, could also have a shape deviating from a complete sphere. In every case, they would have to be symmetrical to a line of symmetry of the positioning element. After performed positioning, the line of symmetry of the positioning element then co-incides with the centering center lines 20 of the positioning recesses. In the present case, where the positioning elements represent "ideal" spheres, infinitely many lines of symmetry let themselves be defined, of which one always co-incides after completed positioning with the centering center lines.

The spacing 6 of the two bores 4 in the component 1 is nominally equal to the distance 5 between the two bores 4 in the components 2. In the production of the two components 1 and 2, it was ensured that a spacing 7 between edge 10 of the component 1 and the nearest bore as well as a spacing 8 between edge 11 of the component 2 and the nearest bore are accurately maintained.

After introduction of the positioning elements 3, here developed as spheres, into the bores 4, a later still more accurately to be described jointing or clamping process takes place under the effect each time of a pair of equally great, mutually opposed clamping forces, which are here for example exerted by a screw 12, disposed perpendicularly to the interface 13 and present each time for each positioning location.

During the clamping process, an alignment of the two components against one another ensues due to the self-centering effect of positioning recesses and positioning elements. In that case, a desired spacing 9 between the edge 10 of the component 1 and the edge 11 of the component 2 is obtained automatically and accurately as the difference between the spacings 8 and 7. It is self-evident that the components are also at the same time brought into a predetermined relative position in a direction disposed perpendicularly to the plane of the drawing.

On the component 1 being rotationally symmetrical, a single positioning location suffices for the positioning of component 1 in a certain position relative to component 2 when the centering centre lines of the bores co-incide with the rotational axis of the component 1.

The transmission of forces directed parallel to the interface 13 defined between one component and the other can take place to a certain extent with the aid of positioning elements. As a rule, however, the clamping force connecting the two components will be of such magnitude that such transverse forces are absorbed by the force-locking effected by static friction and arising at the abutment surfaces defining the interface.

For the positioning of a non-rotationally symmetrical component relative to another component in the plane of the common interface 13 in two directions disposed perpendicularly to one another, two positioning locations suffice. A greater measure of accuracy may however be attained in such a case by the provision of more than two positioning locations. This rests on the fact that (as will still be explained later) a certain averaging of the positional deviations of all centering centre lines ensues due to the deformation of the walls of the bores arising on the clamping together of the components.

It is self-evident that more than two components may be positioned relative to one another according to the scheme illustrated here.

In FIGS. 2 and 3, the positions assumed in timely sequence by the components on the latter being clamped together are illustrated. Both FIGS. 2 and 3 show a section perpendicular to the interface 13 through the centering centre lines 20 of the bores 4.

FIG. 2 shows the relationships after completion of the first jointing stage. In that case, component 1 and component 2 have been guided towards one another without influence of an external force after preceding introduction of the positioning element until the positioning element 3 comes into contact with the inside wall of the respective bores in the components 1 and 2. In that case, a spacing 14, defined by the geometrical shape of positioning element and positioning recess, arises between the individual outer surface portions 15 and 16, which are not yet bearing against one another, of the respective components 1 and 2.

The size of the spacing 14 is a function of the geometric shape of positioning element and positioning recess, the deformability of the positioning element and the walls of the bores, the production tolerances to be maintained and other further factors. The spacing 14 in the border line case can have the value zero without the centering effect being lost.

It was mentioned that the first jointing stage can be attained without application of any substantial external force to clamp the two components together. In practice, of course, the gravitational force of one of the two components will in most cases participate in the performance of the manipulation for the attainment of the first jointing stage. It does however exercise no effect up to the instant of the attainment of the positive or so-called shape-locking engagement and the first jointing stage completed therewith. Due to the geometrical relationships, which apply in the case of the combination of positioning elements and positioning recesses coming into question, a self-centering effect is always assured between positioning element and positioning bore. Thereby, a relatively accurate alignment of the two parts to be positioned is already attained after the first jointing stage in a plane parallel to the joint surfaces 15 and 16. When the alignment of two parts to be positioned is to take place by way of more than three positioning locations, then it can happen due to the production tolerances always present in practice that the conclusion of the first jointing stage is at first attained only at three positioning locations before the exertion of external tightening forces. The conclusion of the first jointing stage is in this case attained in the remainder only after exertion of clamping forces, which in the three positioning locations first coming to shape-locking already initiate the (later still more accurately to be explained) second jointing stage and thereby, as well as due to certain slight deformations of the entire components 1 and 2, also bring the remaining positioning locations into shape-locking.

For the case that only two positioning locations are provided, a small lack of parallelism of the surfaces 15 and 16 can arise after conclusion of the first jointing stage. However, this leads to no advantage since this lack of parallelism is again eliminated on the performance of the second jointing stage.

After completion of the first jointing stage, a contact is present between positioning element and positioning recess or a bearing of the centering surfaces of the positioning recesses is present at the centering sections of the positioning element, which according to chosen geometry of bore and element can be point-shaped, line-shaped or area-shaped.

The positioning location, illustrated in FIGS. 2 and 3 are preferred mode of execution, consists of a respective conical bore 4 in component 1 and component 2 with a spherically shaped positioning element 3 centering both bores. In that case, the depth of bore and the diameter of sphere are due to tolerances so matched to one another that a spacing 14 remains between the two joint surfaces 15 and 16 after conclusion of the first jointing stage. FIG. 3 shows the positioning location after conclusion of the second jointing stage, with which the positioning process is terminated.

The second jointing stage is initiated by the exertion of a pair of equally great clamping forces, generated by special means and acting in opposition on a line of action. The clamping forces are in that case perpendicular to the surfaces 15 and 16 of the two components to be connected. In FIG. 3, these forces are symbolised by the arrows 17. Under the influence of the forces, which for example are generated by a screw as illustrated in FIG. 1, a deformation of the positioning element and of the portions of the material surrounding the walls of the two bores takes place. In that case, the positioning element penetrates more deeply into both bores 4 while at the same time due to the deformation of material, the lines of contact 18 (in FIG. 2) present after conclusion of the first jointing stage between positioning element and bore walls enlarge to contact areas 19. The contact areas 19 arisen due to the deformation converge in the same direction, in which the relative displacement of the positioning element ensues.

With the deeper penetration of the positioning element into the bores, the spacing 14 between the joint surfaces 15 and 16 is continuously reduced until it assumes the value zero and both positioning parts abut against one another in a common interface 13.

During the penetration of the positioning element into the bore, very large forces are exerted on the walls thereof. For the case that the positioning element disposes of a greater hardness than the material surrounding it, the main component of the necessarily arising deformation of material will occur at the walls of the bores.

From these consciously undertaken deformations or from the consciously generated forces, the following advantages now result, which contribute substantially to the attainable, very great positioning accuracy:

Surface roughnesses are flattened. It is thereby avoided that a positional deviation is caused by forces parallel to the joint surface, which must be overcome during the positioning process, in that these forces must first undertake a flattening of the surface roughness before they are opposed by a significant resistance due to full area contact.

Beyond the flattening of surface roughnesses, the deformation of the bore walls and of the positioning element derived from the tensioning forces effects an enlargement of the zone of contact. This enlargement has the consequence that for further deformation by a certain amount, a greater force is of course required than would be necessary for example to deform a line-contact zone by the same certain amount.

This means furthermore that a certain force, parallel to the joint surface and hindering the positioning process, in one case effects a smaller positional deviation than in another case.

The great specific pressure force derived from the tightening forces furthermore effects an averaging of non-circularities of the bore. In the case of a hard and highly accurate positioning element, for example a hardened steel sphere, a post-sizing of the positioning bore is thus in a sense undertaken by the positioning element simultaneously acting as tool during the tightening together. Apart from the averaging of non-circularities, a mean-value formation of the individual positioning deviations takes place in the case of several positioning locations being present due to deformation and the equilibrium of force setting in.

The above mentioned advantages form the consciously undertaken deformations can however also be attained when the deformations take place predominantly in the material of the positioning element. This is for example the case when the positioning elements consist of plastics and the walls of the positioning bores surrounding them of metal. The use of plastics positioning elements has beyond this still the advantage of very low manufacturing costs and a very great freedom of structuring in the case of a structure deviating from the pure spherical shape.

At the instant, in which the spacing 14 assumes the value zero, the second jointing stage is concluded and the positioning process is terminated. The clamping force can however still be further increased, for example to enable the forces transmissible between the two components to be enlarged. Of course, the conclusion of the two described stages can take place in very short time one after the other, so that the difference between the two stages cannot be perceived by the eye. Nevertheless, the two stages will also in these cases be run through at each alignment location because the overcoming of a spacing, however small, which is present between the bearing surfaces after attained shape locking of the first jointing stage and the build-up of the necessary tightening force connected therewith, requires a measurable span of time.

The deformation necessarily arising in the performance of the second jointing stage in consequence of area pressure can restrict themselves predominantly to the positioning recesses (and the part of the positioning elements disposed therein) of only one of the two components. This is for example the case when bores and positioning elements are so developed in one of the parts that no self-centering effect due to deformation or also no relative displacement between positioning element and bore can result. This is shown distinctly by the still later to be explained FIG. 20.

One individual positioning location with an arrangement of bores and element, as it is shown in the FIGS. 1 to 3, is capable on performance of the second jointing stage to undertake a centering of both bores 4 belonging together, in which case an aligning effect can be attained in infinitely many planes of action disposable through the centering centre line 20.

In certain cases of application, it can be advantageous to have an aligning effect to be aimed at by the positioning element only in a certain plane of action. For this case, the positioning recesses can be formed by positioning grooves which are put into the joint surface of a component. One can for example suppose that in FIG. 2, the contour, formed by the section and symmetrical to the centering centre line 20, in component 1 originates from a conical bore, while the contour, formed by the section and symmetrical to the centering centre line 20, in component 2 originates from a straight groove, extending perpendicularly to the plane of the drawing and with tapered side walls. In this case, an exertion of the tightening forces for the performance of the second jointing stage, only such aligning forces can be generated in component 2, which lie in a plane of action lying in the plane of the drawing. In case the parts to be tightened together dispose of planar joint surfaces, one can distinguish between straight and circularly extending positioning grooves, while in the case of cylindrical joint surfaces, one distinguishes between annular grooves, which in their longitudinal extent extend perpendicularly to the axis of the cylinder, and straight grooves, which extend parallel to the axis of the cylinder. By contrast to a positioning bore, which disposes of only a single centering centre line, through which however infinitely many planes of action can be disposed, a positioning groove disposes over infinitely many centering centre lines, through which in each case only a single plane of action can be disposed. The sum of all infinitely many centering centre lines of a positioning groove, which always stand perpendicularly on the joint surface, forms a surface, which is here called the surface of symmetry of the positioning groove. This surface of symmetry is furthermore characterized by the feature, that it is disposed perpendicularly on all infinitely many planes of action, while within one plane of action the spacing of the side walls of the positioning groove is symmetrical to the surface of symmetry and the position of the positioning groove in the joint surface can be described by the points of intersection of surface of symmetry and planes of action.

With a suitable positioning element, for example with a sphere, a positioning groove put in to the joint surface of a first part can form a positioning location with a positioning bore put in to the joint surface of a second part as well as also with a second positioning groove put into the joint surface of a second part and undertake an aligning action in the provided plane of action of the positioning groove of the first part.

FIG. 4 shows a combination of positioning groove and positioning bore. Here, a sphere 26 is employed as preferred positioning element and the positioning groove 27 in a preferred embodiment displays side walls converging to the base of the groove. FIG. 4 shows a parallelepipedal component 21, which has been positioned on a component 22 rotationally symmetrical to the central axis 23. In that case, a positioning of the two parts was performed in such a manner that a central axis extending perpendicularly to the contact surface, of the component 21 co-incides with the central axis 23 of the component 22. In the component 21, four positioning bores are disposed in a manner similar to that shown in FIGS. 1 to 3. The centering centre lines 25 of these bores lie on a cylinder of radius 24, the central axis of which co-incides with the not shown central axis of the component 21. Put into the joint surface in the component 22 is a circularly shaped positioning groove 27, the infinitely many centering centre lines of which lie on a cylinder of radius 24, the central axis of which co-incides with the central axis 23 of the component 22.

A section, which is disposed through a centering centre line 25 and through the central axis 23 and which thus by definition lies in a plane of action, would for the positioning location after conclusion of the first jointing stage and after conclusion of the second jointing stage, respectively, be in about the same relationships as that in which they have been represented in FIGS. 2 and 3, respectively. There is however one difference, which cannot be brought to expression in such a sectional image: In the arrangements according to FIGS. 1 to 3, where the wall of the positioning bore forms a hollow core and the positioning element is a sphere, a line of contact results after conclusion of the first jointing stage and an area of contact between element and bore wall after conclusion of the second jointing stage. In the arrangement according to FIG. 4, two points of contact result between positioning element and positioning groove after conclusion of the first jointing stage and two areas of contact due to a preceding deformation of side walls of the positioning groove and positioning element after conclusion of the second jointing stage.

The pair of mutually associated tightening forces required for the performance of the second jointing stage is exerted in FIG. 4 by not shown, special means and symbolically indicated by the arrows 28.

The same positioning action would let itself be attained at component 21 and 22 if there were put into the joint surface at component 2 likewise a circularly shaped positioning groove, the infinitely many centering centre lines of which lie on a cylinder of radius 24 and wherein the central axis of this cylinder co-incides with the not shown central axis of the component 21.

In this case, the spheres 26 serving as positioning elements would have to be located, for example by cementing, in the positioning groove of one of the two parts before the tightening together.

In FIG. 4, spheres are shown as positioning elements. They have the advantage that they can co-operate with positioning bores as well as also with positioning grooves. In the presence of a positioning groove in each of the joint surfaces of both components, differently shaped positioning elements can also come into application, inter alia such as go into a line-shaped contact with the walls of the grooves. Such an element can for example in the case of linearly extending positioning grooves be a long, thin cylindrical body or, for example, in the case of circularly shaped positioning grooves, such as the groove 27 in FIG. 4, a closed toroidal body or a part of a toroidal body. Thus, the centering portion of the positioning element is defined by a peripheral surface portion of either a toroidal body or a body having the shape of a portion of a toroid. The walls of the positioning grooves do not necessarily have to run convergingly towards the base of the groove. They can also be parallel to one another when care is merely taken by the choice of a suitable positioning element, for example a sphere, that a self-centering effect arises during the displacement of element and groove in one another during the performance of the second jointing stage.

The positioning location, formed of two circularly shaped positioning grooves and a positioning element in the shape of a closed or open toroidal body, can advantageously be arranged concentrically around a threaded bore or passage bore for a fastening screw. Such a positioning location can transmit higher transverse forces directed parallel to the joint surface that a positioning location equipped with a sphere. Moreover, the machining production of annular positioning grooves can be performed at relatively low cost by a work operation related to turning.

When one considers the section contours of the possible combinations of positioning grooves and associated positioning elements or the possible combinations of positioning bores and associated positioning elements in section through one of their planes of action, then the same images go here. For this reason, the most important combinations between positioning elements and positioning recesses, characterized by the above mentioned section contours, have in the following been presented as further development of the invention in common for bores and grooves, namely in the FIGS. 5 to 16. In all FIGS. 5 to 16, a second is shown each time through a plane of action of a positioning location after performed second jointing stage. The illustrated contours can result from a combination of bore with bore, bore with groove or groove with groove. In all FIGS. 5 to 16, it is to be regarded as essential that at least within one of the two components at the latest after performance of the second jointing stage, thus after material deformation has occurred, two converging lines of contact result in the plane of action between the positioning element and the walls of the positioning recess, whereby the self-centering effect is assured. Within one of the two components, this self-centering effect can be dispensed with when the positioning element has been inserted free of play into the component before the tightening process, for example when the positioning element partially formed as cylinder was fastened by a press fit in a cylindrical bore in one of the components, as this is shown in FIGS. 11 to 14, which will be described in greater detail subsequently.

Figure 5:
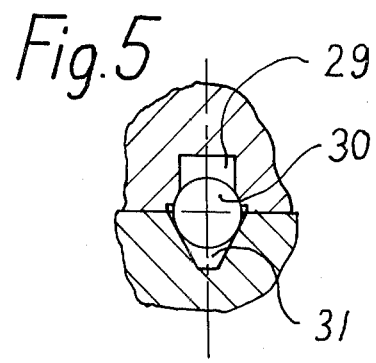

FIG. 5 shows a sectional contour as it for example arises when initially a recess 29 is a cylindrical bore, a positioning element 30 is a sphere and recess 31 is a conical bore.

Figure 6:
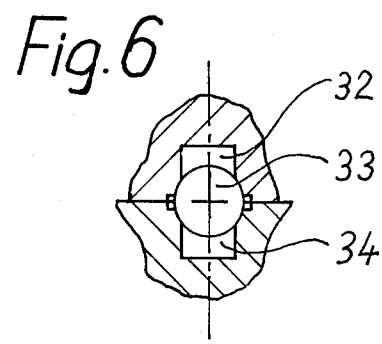

FIG. 6 shows a sectional contour as it for example arises when initially a recess 32 is a cylindrical bore, a positioning element 33 is a sphere and a recess 34 is a cylindrical bore.

Figure 7:
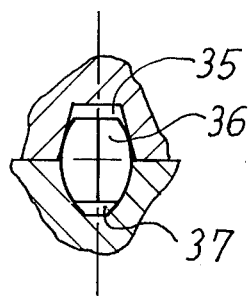

FIG. 7 shows a sectional contour as it for example arises when initially a recess 35 is a conical bore, a positioning element 36 is barrel-shaped and a recess 37 is part of a band-shaped bore.

Figure 8:
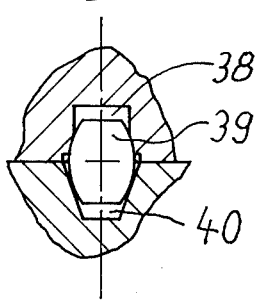

FIG. 8 shows a sectional contour as it for example arises when initially a recess 38 is a cylindrical bore, a positioning element 39 is barrel-shaped and a recess 40 is a conical bore.

Figure 9:
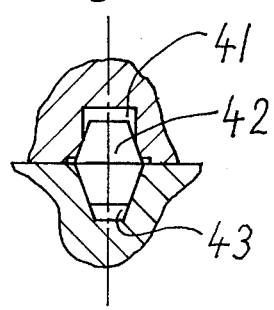

FIG. 9 shows a sectional contour as it for example arises when initially a recess 41 is a cylindrical bore, a positioning element 42 is a double cone and a recess 43 is a conical bore.

Figure 10:
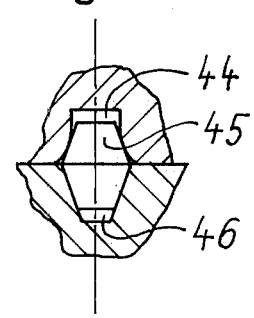

FIG. 10 shows a sectional contour as it for example arises when initially a recess 44 is a convexly converging hollow cylinder, a positioning element 45 is a double cone and a recess 46 is a conically converging bore.

Figure 11:
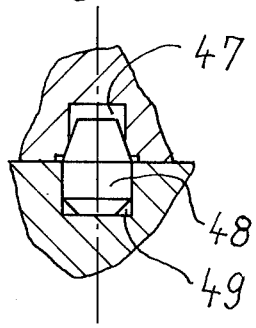

FIG. 11 shows a sectional contour as it for example arises when initially a recess 47 is a cylindrical bore, a positioning element 48 comprises part of a cone and part of a cylinder and a recess 49 is a cylindrical bore.

Figure 12:
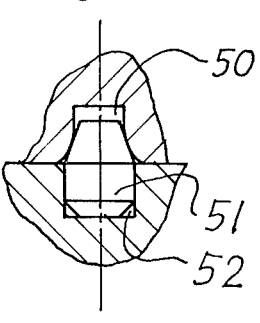

FIG. 12 shows a sectional contour as it for example arises when initially a recess 50 is a convexly converging hollow cylinder, a positioning element 51 comprises part of a cone and part of a cylinder and a recess 52 is a cylindrical bore.

Figure 13:
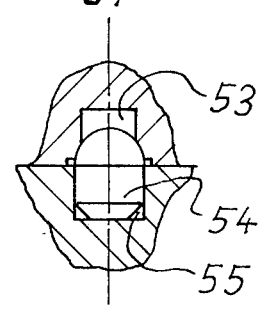

FIG. 13 shows a sectional contour as it for example arises when initially a recess 53 is a cylindrical bore, a positioning element 54 is a cylinder provided with a conically shaped dome, and a recess 55 is a cylindrical bore.

Figure 14:
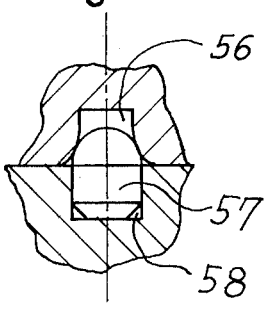

FIG. 14 shows a sectional contour as it for example arises when initially a recess 56 is a conically converging cylindrical bore, a positioning element 57 comprises a cylinder provided with a spherical dome, and a recess 58 comprises a cylindrical bore.

FIG. 15 shows a sectional contour as it for example arises when initially a recess 59 is a cylindrical bore, a positioning element 60 comprises a sphere provided with a spherically shaped dome put on at the side of the larger diameter, and a recess 61 is a conical bore.

FIG. 16 shows a sectional contour as it for example arises when initially recess 62 is a conically converging cylindrical bore, a positioning element 63 comprises a cone provided with a conical dome put on at the side of the larger diameter, and recess 64 comprises a conical bore.

For the case that the original material of one of the components is not suitable for the formation of a positioning location, special bodies of suitable material can be provided, which are inserted into the component or fastened to the component and at which the suitable recesses for the formation of a positioning location are applied.

FIG. 17 shows two components to be put together, into which special bodies 65 were inserted, at which the recesses 66, required for the formation of a positioning location, are present. Such bodies can be cast in for example in the case of metallic and non-metallic components, which are cast or die-cast.

FIG. 18 shows two components, to which special bodies 67 are fastened, on which are present the recesses 68 required for the formation of a positioning location. Such bodies can for example be welded or cemented on.

It is frequently advantageous to provide a protection of the positioning elements against falling out. The simplest kind of the protection consists in the clamping-in of the positioning element in the positioning bore or the positioning groove of one of the two components. This succeeds most simply in the case of a sectional contour such as that shown in FIGS. 11 to 14. Further protective devices are shown in the FIGS. 19 to 23. FIG. 19 shows a positioning location provided with conically executed positioning bores 69 and with a spherically shaped positioning element 70. At the line of contact between the sphere 70 and one of the positioning bores 69, the sphere is adhered to the wall of the positioning bore. This can occur for example by cementing or by spot-welding. Of course, this mode of attachment is also suitable for other shapes of positioning elements and bores or grooves.

FIG. 20 shows a positioning location with a conical positioning bore 27 in the component 75 and a positioning element 73, which is developed as cylinder with a spherical dome put on. The element 73 is embedded over its entire cylindrical length in the material of the component 74 or in particular material, which is specially intended for this embedding and which has been partially applied to the component 74. Such an embedding is for example possible by sounding the element into plastics material with the aid of ultra-sonics or by lining after preceding insertion of the element into a prefabricated material recess of the component 74. With such a fastening of the element, the bore or positioning groove receiving the element is thus only created during the insertion process itself. Moreover, the geometric shape of the positioning bore 72 and that of the partial piece of the positioning element 73 disposed in contact therewith is exclusively decisive in this case for the centering of the components 74 and 75, whereas the geometric shape of the partial piece of the positioning element 73 accommodated in the component 74 can be as desired.

FIG. 21 shows a positioning element 76, which by its spherically developed part 77 together with the conically shaped part of the positioning bore 79 takes over the positioning task as such for the (not shown) second component. A projection 78 of the positioning element, which for example can likewise be developed to be partially spherically shaped, is clamped fast in the cylindrical part of the positioning bore 79 and thus secures the positioning element 76 against falling out of the bore.

The spherically shaped development of the projection 78 affords the possibility that no obstruction can arise due to the projection 78 itself in case the positioning part 77 as such must once execute a lateral displacement which can occur for reasons of averaging of tolerances of the centre spacings of the bores.

FIG. 22 shows similar relationship to that illustrated in FIG. 21, the positioning element here however consisting not of an originally unitary body, but being formed by two individual elements, which are abutted against one another and which here both can have the shape of a sphere. The two spheres can be connected for example by welding or by soldering. The large sphere in that case functions as positioning element as such, while the small sphere clamped into the cylindrical part of the positioning bore takes over the function of the fastening of the entire body.

FIG. 23 shows a positioning element consisting of a partially spherically shaped part 80, which carries out the positioning function as such and which is provided with a material recess 82 and a projection 81 formed as screw. The positioning bore in the component 85 consists of a conically developed part 83 and a cylindrical part 84, which is provided with a thread.

The fastening of the positioning element occurs by threading the projection 81 developed as screw into the part 84 of the positioning bore provided with a thread. The threading in its facilitated by the material recess 82, which can be developed for example as internal hexagon.

Positioning elements developed in that manner can be fastened by the threaded projection not only in one of the two components to be put together, but the actually positioning part 80 of the positioning element can in that case also be pressed into the positioning part of the positioning bore, in the present case into the conically developed part 83 of the bore, in such a manner that a dimensionally definable point of the positioning element, for example the spherical centre of the partially spherically shaped partial piece 80, assumes a definable spacing from the joint surface 86. This spacing can be checked over for example by a gauge ring 87.

This process of the pressing-in of the part 80 of the positioning element into the portion 83 of the positioning bore practically represents partially an anticipation of the formation at the partial piece 80 of the element and at the part 83 of the bore as it is otherwise performed in the second jointing stage during the actual tightening process. Hereby, the performance of the first and second jointing stage in connection with the (not shown) second component is however not impaired.

The exertion of the clamping force necessary for the performance of the second jointing stage may be applied by an elongate threaded member. To save space, it can be advantageous to pass the threaded member through the positioning element or to execute the positioning element itself as a part of the screw connection.

FIG. 24 shows a positioning location after performed second jointing stage with the components 88 and 89, with a screw 90 and with a positioning element, consisting of a here partially spherically executed positioning part 91, with a threaded bore 95 and a threaded projection 92. With the aid of the projection 92, the positioning element can be put into the bore of the component 89 in the same manner as was described for the element in FIG. 23. In the arrangement according to FIG. 24, it may be necessary to press the positioning part 91 very strongly into the positioning bore of the component 89 or to place the shank of the screw-shaped projection 92 under strong initial stress, since the screw 90 must not only take over the tightening force necessary for the performance of the second jointing stage, but also partially or wholly the operating forces arising in the connection between the components 88 and 89. In order to let the positioning part 91 penetrate only up to a defined depth in the component 89 during the exertion of the initial stress required in the screw-shaped projection 92, an abutment surface 93 is provided therein, against which the positioning part 91 comes into abutment by a correspondingly developed planar surface after preceding deformation of the conical wall, serving as centering surface, of the bore in component 89.

In order to be able with the aid of a special tool to introduce a great turning moment in the positioning part 91, a toothing is provided at the end face 94 thereof. With the employment of a hollow screw tool, the same can be connected force-lockingly by a screw introduced into the threaded bore 95 with the positioning part 91, so that a raising off of the tool from the toothing is avoided.

The threaded bore 95 is provided mainly therefore, that a screw 90 can be introduced into it, by which the tightening forces required for the jointing of the two components 88 and 89 can be exerted.

FIG. 25 shows a positioning location after performed second jointing stage. Here, the actual positioning section 97 of the positioning element possesses two projections 98 and 99 in the form of threaded shanks. The exertion of the clamping forces is carried out by way of the screw shanks with the aid of nuts. It is desirable also with this arrangement to preassemble the entire positioning element in one of the two components, for example in the lower. In this case, a centering, connected with material deformations, of the positioning section 97 in the positioning bore of the one component must be undertaken. Moreover, the threaded shank 99 must be placed under a certain initial stress in order later to be able to absorb high operating forces. To ensure in that case that the positioning section 97 penetrates into the component only up to a certain depth, a planar surface, against which the planar surface 96 of the positioning element comes into abutment, is provided in the lower part of the positioning bore.

FIG. 26 shows a positioning location after performed second jointing stage with a positioning element executed as a drilled-through sphere. A screw for the exertion of the tightening forces is guided through the bore of the positioning element. The screw can be replaced by a rivet. It can be desirable also on the application of this positioning element to ensure that the positioning element in at least one component penetrates only up to a certain depth. It is provided for this purpose that the positioning element on at least one side receives a (not shown) planar surface, which is disposed perpendicularly to the axis of the bore and by which it can come into abutment against a corresponding planar surface of the positioning bore similarly to how this occurs with the planar surface 96 in FIG. 25.

We claim:

1. A positioning device for positioning two components relative to one another in each of three mutually perpendicular co-ordinate directions, said device comprising a first component having at least one bore therein, said bore having an opening in a substantially planar outer surface portion of said first component and having a substantially conical wall surface portion disposed symmetrically with respect to an axis extending substantially perpendicularly of said outer surface portion and passing through said bore, said substantially conical wall surface portion being of increasing cross-section towards said opening, and a second component provided with a positioning element having a free end portion thereof extending outwardly from a substantially planar outer surface portion of said second component and received within said bore by way of said opening, said free end portion of said positioning element having a substantially spherical centering portion of reducing cross-section towards the outer extremity of said free end portion and having an axis of symmetry alignable with said first mentioned axis of symmetry, the major diameter of said inserted portion being less than that of said opening, whereby — on said first and second components being urged towards one another to cause said positioning element to enter said bore — said substantially planar outer surface portions of said first and second components are brought into mutually abutting relationship to define an interface between said first and second components whilst only said substantially spherical centering portion of said positioning element is brought to bear against said substantially conical wall surface portion of said bore, said substantially conical wall surface portion being tapered to include at said axis an angle smaller than that subtended thereat by any two notional tangents to said substantially spherical centering portion at points thereon disposed symmetrically relative to said axis and inwardly of said bearing surfaces, said conical wall surface portion extending outwardly from said bearing surfaces to be spaced apart from the surface portion of said positioning element facing said conical wall surface portion, said substantially spherical centering portion being brought to bear with sufficient force to cause material deformation of at least one of said substantially conical wall surface portion and said substantially spherical centering portion thereby to enlarge at least one of said bearing surfaces and to positively locate said positioning element in said bore free of play in a first of said co-ordinate directions parallel with said axis and in each of two further ones of said co-ordinate directions.

2. A device as defined in claim 1, wherein each said component is provided with at least one said bore, said bores being of like kind and each said positioning element being disposed symmetrically with respect to said interface.

* * * * *